United States Patent
Seki et al.

(10) Patent No.: US 7,819,993 B2
(45) Date of Patent: Oct. 26, 2010

(54) METHOD FOR PRODUCING LIGHT GYPSUM BOARD

(75) Inventors: Masanobu Seki, Kawaguchi (JP); Yoshitsugu Nakamura, Tokyo (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 461 days.

(21) Appl. No.: 10/531,218

(22) PCT Filed: Oct. 15, 2003

(86) PCT No.: PCT/JP03/13183

§ 371 (c)(1), (2), (4) Date: Apr. 14, 2005

(87) PCT Pub. No.: WO2004/039749

PCT Pub. Date: May 13, 2004

(65) Prior Publication Data

US 2006/0162839 A1 Jul. 27, 2006

(30) Foreign Application Priority Data

Oct. 29, 2002 (JP) ............................ 2002-314847

(51) Int. Cl.
*B32B 37/24* (2006.01)
(52) U.S. Cl. ..................... 156/43; 106/672; 106/678; 106/680; 106/682
(58) Field of Classification Search ............... 156/43; 106/678, 680, 682, 672
See application file for complete search history.

(56) References Cited

U.S. PATENT DOCUMENTS 4,156,615 A * 5/1979 Cukier ..................... 156/39

(Continued)

FOREIGN PATENT DOCUMENTS

GB 2032413 * 5/1980

(Continued)

OTHER PUBLICATIONS

Translation for Japan 10-330174 (Dec. 2009).*

(Continued)

*Primary Examiner*—Steven D Maki
(74) *Attorney, Agent, or Firm*—Ladas & Parry LLP

(57) ABSTRACT

Provided is a method of manufacturing a weight-saved foamed gypsum board having a gypsum core with high strength and excellent adhesion properties of the gypsum core with base papers for gypsum board, which method is capable of adjusting the sizes of pores in a gypsum core of a weight-saved gypsum board product into a desired range in a short time and at a low cost, even if the kinds and the compounding ratios of gypsum raw materials vary. The method of manufacturing a weight-saved gypsum board in which pores with a predetermined size are distributed in a gypsum core, includes the steps of blowing air into a foaming agent to produce foams, mixing the foams into a kneaded material that contains calcined gypsum and water to obtain foamed gypsum slurry, pouring the foamed gypsum slurry into a space between upper and lower base papers for gypsum board, shaping the base papers and the foamed gypsum slurry into a board shape, roughly cutting off and subsequently drying the board-shaped one, and cutting off the dried and shaped one into a product dimension, wherein the method further comprises the step of preliminarily adding a pore size adjusting agent for adjusting sizes of foams distributed in the foamed gypsum slurry to one of a stock solution of the foaming agent and a mixture of a stock solution of the foaming agent and water to obtain the foaming agent for producing foams with desired sizes.

5 Claims, 8 Drawing Sheets

U.S. PATENT DOCUMENTS

| | | | | |
|---|---|---|---|---|
| 4,618,370 | A | * | 10/1986 | Green et al. .................. 156/43 |
| 4,804,688 | A | * | 2/1989 | Vassileff ...................... 521/64 |
| 5,085,929 | A | | 2/1992 | Bruce et al. |
| 5,158,612 | A | * | 10/1992 | Savoly et al. ................. 156/43 |
| 5,240,639 | A | * | 8/1993 | Diez et al. .................... 156/39 |
| 5,643,510 | A | | 7/1997 | Sucech |
| 5,714,001 | A | | 2/1998 | Savoly et al. |
| 2006/0278128 | A1 | * | 12/2006 | Liu et al. .................... 106/678 |

FOREIGN PATENT DOCUMENTS

| | | | |
|---|---|---|---|
| JP | 54-1324 | | 1/1979 |
| JP | 01-290573 | | 11/1989 |
| JP | 06-024869 | | 2/1994 |
| JP | 06-048862 | | 2/1994 |
| JP | 07-069700 | | 3/1995 |
| JP | 10-330174 | * | 12/1998 |
| JP | 3028123 | | 2/2000 |
| SU | 1252321 | * | 8/1986 |
| SU | 1252322 | * | 8/1986 |

OTHER PUBLICATIONS

Taiwanese Office Action including English Translation (Nov. 2, 2009).

* cited by examiner

METHOD FOR PRODUCING LIGHT GYPSUM BOARD

TECHNICAL FIELD

The present invention relates to a method of manufacturing a weight-saved foamed gypsum board (hereinafter called "a weight-saved gypsum board") having a gypsum core with high strength and excellent adhesion properties of the gypsum core with base papers for gypsum board. More particularly, the present invention relates to a method of manufacturing a weight-saved gypsum board, capable of adjusting the sizes of pores in a gypsum core of a weight-saved gypsum board product into a desired range in a short time and at a low cost, even if the kinds and the compounding ratios of gypsum raw materials vary.

BACKGROUND ART

A gypsum board is a representative gypsum-based building material. Commonly, gypsum board is manufactured according to the following steps. First, foams are preliminarily produced by blowing air into a foaming agent for weight-saving the gypsum board. Then, foams produced from the foaming agent are mixed into a kneaded material that contains a calcined gypsum, an adhesive, various additives and water using a mixer so as to prepare a foamed gypsum slurry to be used as a gypsum core. Then, the prepared foamed gypsum slurry is poured into a space between upper and lower base papers for gypsum board and covered with the base papers for gypsum board. Then, the gypsum slurry covered with the base papers for gypsum board passes through a shaping machine for determining the thickness and width of a gypsum board so as to be shaped into a predetermined board shape. Subsequently, the strip-type original gypsum board that is shaped into a board shape is roughly cut off and passes through a force-drying machine. Finally, the original board after the drying is cut off to a predetermined dimension for a gypsum board product. That is, the gypsum board is a board-shaped structure, in which a gypsum core obtained by the above-mentioned pouring and shaping method is covered with base papers for gypsum board, and has excellent fire resistance, sound insulation, workability and economical efficiency.

In recent years, gypsum board has been used as an interior material in high-rise or super high-rise buildings that are spreading rapidly, as well as in general buildings and low-rise or middle-rise buildings. Gypsum board is known to have excellent properties in regard to adaptability to a building process, weight saving for a building, and flexibility against building oscillation. The weight saving for a gypsum board primarily depends on the ratio of gypsum being a gypsum core material and pores formed by foam, and the less the amount of the gypsum is, that is, the more the amount of the pores formed by the foams, the weight saving is further advanced. However, a reduction in the amount of gypsum may cause the strength of the gypsum core to lower and failure of the adhesion of the gypsum core with the base paper for gypsum board so as to degrade the commercial value of the gypsum board product. Thus, the amount of gypsum is consequentially decided and the weight saving for the gypsum board is limited.

Methods for manufacturing a gypsum board have been studied such that the gypsum board is weight-saved while the strength of the gypsum board is maintained by changing the structure and distribution condition of pores in the gypsum core. As an example of such studies, conventionally, foams obtained by blowing air into a foaming agent exhibiting excellent stability are mixed into a gypsum slurry so as to produce many small pores in the gypsum core, thereby achieving the weight saving for the gypsum board. However, recently, a modification technique for a gypsum core has been proposed which can achieve the weight saving for the gypsum board by containing relatively large independent pores uniformly in the gypsum core.

Such a modification technique for a gypsum core is disclosed in Japanese Patent No. 3028123, in which foams with a desired density are prepared using an aqueous solution of a foaming agent stock solution that contains a particular alkyl ether sulfate and the foams are mixed with gypsum slurry so as to distribute independent large pores uniformly in a gypsum core. Also, a technique whereby foams are produced from a mixture obtained by mixing a particular alkyl ether sulfate as the first foaming agent for forming stable foams in gypsum slurry and a particular alkyl sulfate as the second foaming agent for forming unstable foams in the gypsum slurry with the mixing ratio in a desired range and the mixture of the foaming agent is stirred and mixed with the gypsum slurry, so as to contain relatively large independent pores in a gypsum core, is disclosed in U.S. Pat. No. 5,643,510. Additionally, a technique whereby containing fine pores in a gypsum foamed core is suppressed as much as possible and pores formed by relatively large independent foams are dispersed uniformly by containing a foam stabilizer as well as foams in gypsum slurry for forming the gypsum core is disclosed in Japanese Laid-Open Patent Application No. 10-330174.

In Japan, a gypsum board has conventionally been manufactured using a calcined gypsum obtained by compounding a variety of chemical gypsums such as phosphogypsum, flue gas desulfurized gypsum, neutralized gypsum, and waste recycle gypsum (a gypsum that can be recycled and obtained by scrapping waste materials such as gypsum building materials and gypsum models) and natural gypsum and by calcining a gypsum material that contains the gypsum raw material. However, the sizes and the distribution condition of the pores distributed in a gypsum core are significantly influenced by the kinds and compounding ratios of the above-mentioned gypsum raw materials. In a production plant for gypsum board, the proper gypsum raw materials to use in the plant cannot be freely selected from the various gypsum raw materials and use has to be made according to the fields and demand-supply balance of the respective gypsum raw materials. Consequently, the kinds and compounding ratios of the gypsum raw materials for the gypsum core directly influence the quality of the gypsum board product and have been a particularly serious problem.

Another problem is that the compounding ratios of the gypsum raw materials vary due to various factors so as to effect a bad influence on the pore sizes in the gypsum core in sequential processes from the receipt of the above-mentioned various gypsum raw materials to the manufacture of the gypsum board in the production plant for gypsum board.

In the process of preparing foamed gypsum slurry and the process of shaping a gypsum core, it is difficult to detect the influence of the variations in the kinds and compounding ratios of used gypsum raw materials timely. It is also difficult to form independent pores with a desired size steadily and stably in the gypsum core of the gypsum board product, due to the variations in the kinds and compounding ratios of the gypsum raw materials. Sometimes, innumerable communicated fine pores may be formed in a cross section of the gypsum core, so that the strength of the gypsum core is lowered. An extremely large independent pore may be formed in a cross section of the gypsum core so that the visual appearance of the gypsum board is problematic, and partial peeling of a base paper for gypsum board from the gypsum core, called a cluster or blister, may occur.

For the gypsum core modification techniques disclosed in U.S. Pat. No. 5,643,510 and Japanese Patent No. 3028123, the bad influences of the variety of the gypsum raw materials on the formation of the pores are not discussed and the formation of the gypsum core from a single gypsum raw material is presumed. Accordingly, it is known that if these techniques are applied to a method for manufacturing a gypsum board in which the compounding of a variety of gypsum raw materials is changed, the formation of the pores in the gypsum core is significantly influenced and the sizes and the distribution condition of the pores are widely changed. Also, in particular, in regard to the technique disclosed in U.S. Pat. No. 5,643,510, even if a single gypsum raw material is employed, the average number of moles of ethylene oxide added to an alkyl ether sulfate is only adjusted and it is clear that the range of the controllable sizes of the pores is narrow.

In the gypsum core modification technique disclosed in Japanese Laid-Open Patent Application No. 10-330174, enough uniformly distributed and relatively large pores can be formed in the gypsum core against the variation of the kinds and compounding ratios of the gypsum raw materials but an addition of a relatively large amount of foam stabilizer is needed, so that the production cost for the gypsum board is increased.

DISCLOSURE OF THE INVENTION

One of the objects of the present invention is to provide a method of manufacturing a weight-saved gypsum board including a gypsum core having high strength and excellent adhesion properties with base papers for gypsum board.

Another object of the present invention is to provide a method of manufacturing a weight-saved gypsum board capable of adjusting the sizes of pores in a gypsum core of a weight-saved gypsum board product into a desired range in a short time and at a low cost, even if the kinds and compounding ratios of gypsum raw materials vary.

The objects of the present invention described above are achieved by a method of manufacturing a weight-saved gypsum board in which pores with a predetermined size are distributed in a gypsum core, including the steps of blowing air into a foaming agent to produce a foam having bubbles, mixing the foam having bubbles into a kneaded material that contains calcined gypsum and water to obtain foamed gypsum slurry, pouring the foamed gypsum slurry into a space between upper and lower base papers for gypsum board, shaping the base papers and the foamed gypsum slurry into a board shape, roughly cutting off and subsequently drying the board-shaped one, and cutting off the dried and shaped one into a product dimension, wherein the method further comprises the step of preliminarily adding a pore size adjusting agent for adjusting sizes of pores formed by bubbles distributed in the foamed gypsum slurry to one of a stock solution of the foaming agent and a mixture of a stock solution of the foaming agent and water to obtain the foaming agent for producing a foam having bubbles with pores with desired sizes.

In the method of manufacturing a weight-saved gypsum board, preferably, the pore size adjusting agent contains at least one substance selected from the group including agents for increasing sizes of pores formed by bubbles in the foamed gypsum slurry and agents for decreasing sizes of pores formed by bubbles in the foamed gypsum slurry.

In the method of manufacturing a weight-saved gypsum board, preferably, the agent for increasing sizes of pores formed by bubbles in the foamed gypsum slurry contains at least one substance selected from the group including water-soluble acidic substances, strong acids, and water-soluble strong alkaline substances.

In the method of manufacturing a weight-saved gypsum board, preferably, the agent for increasing sizes of pores formed by bubbles in the foamed gypsum slurry contains at least one substance selected from the group including aluminum sulfate, aluminum potassium sulfate, aluminum ammonium sulfate, ferric sulfate, polyferric sulfate, sulfuric acid, sulfamic acid, sodium hydroxide, and potassium hydroxide.

In the method of manufacturing a weight-saved gypsum board, preferably, the agent for decreasing sizes of pores formed by bubbles in the foamed gypsum slurry contains at least one substance selected from the group including sulfosuccinate-type surface active agents, sarcosinate-type surface active agents, alkylbenzene sulfonate-type surface active agents, alkane sulfonate-type surface active agents, and alkylbetaine-type surface active agents.

In the method of manufacturing a weight-saved gypsum board, preferably, a content of the pore size adjusting agent in the foaming agent is 0.00001 parts by weight through 0.005 parts by weight per 100 parts by weight of the calcined gypsum.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

Figure 1:
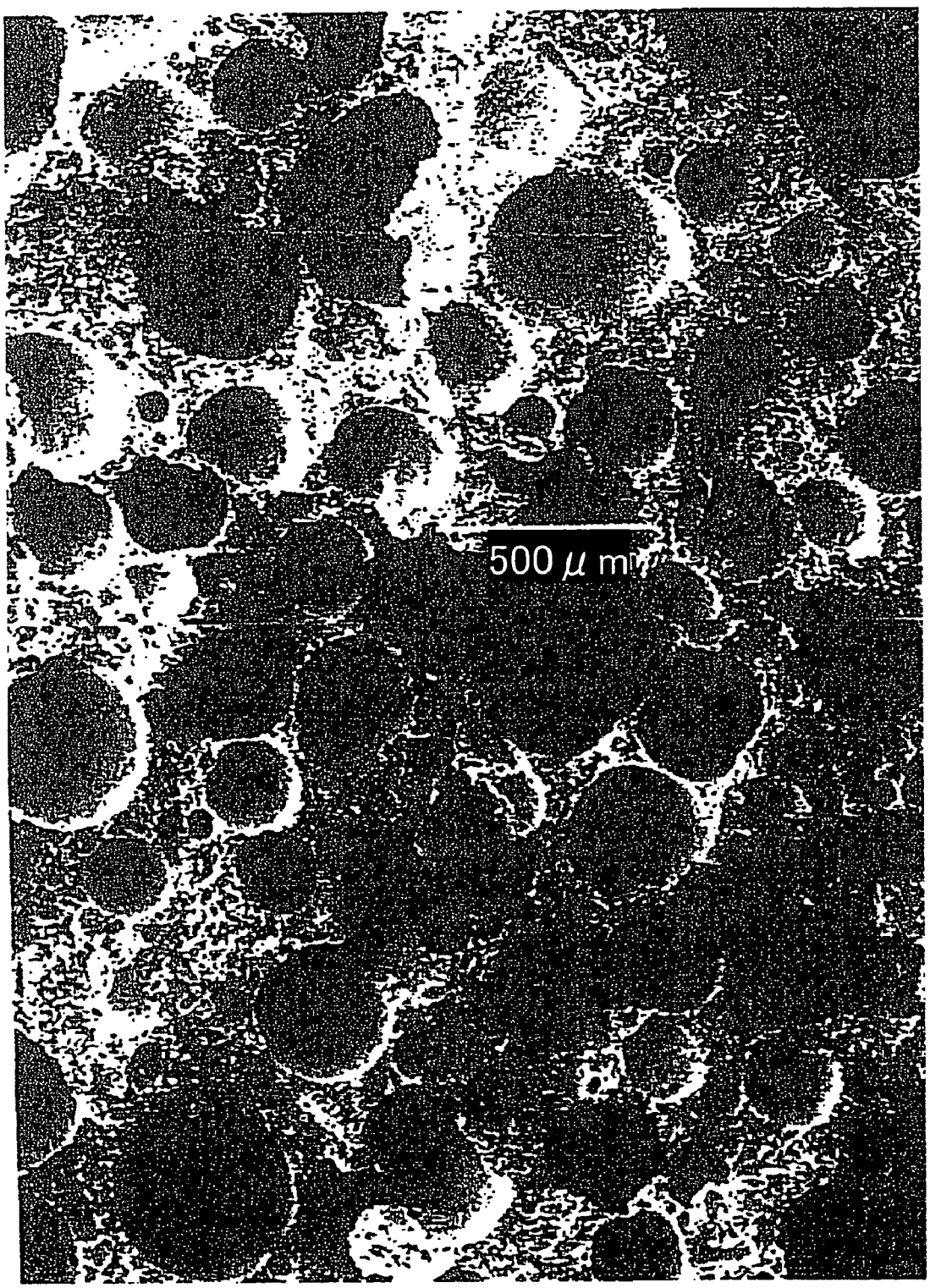
FIG. 1 is a view showing pores in a weight-saved gypsum board according to reference 1.

The preferred embodiments of the present invention are described in detail.

A method of manufacturing a weight-saved gypsum board according to the present invention is similar to the conventional method of manufacturing a gypsum board except that a pore size adjusting agent is added to a foaming agent and, more specifically, the method is implemented according to the following steps. First, foams are produced by blowing (injecting) air into a foaming agent. Then, the foams produced from the foaming agent are mixed into a kneaded material that contains a calcined gypsum obtained by calcining a gypsum material that contains a gypsum raw material and water as principal components, so as to prepare foamed gypsum slurry for a gypsum core. Then, the prepared foamed gypsum slurry is poured and spread on a lower side (front-side) base paper for gypsum board that is continuously delivered, and an upper side (back-side) base paper for gypsum board is wrapped over the spread foamed gypsum slurry, so that the foamed gypsum slurry is covered with the base papers for gypsum board. Then, the foamed gypsum slurry covered with the base papers for gypsum board passes through a shaping machine for determining the thickness and width of a gypsum board so as to be shaped into a predetermined board-shape. Subsequently, the strip-type original gypsum board that is shaped into a board shape is roughly cut off. The roughly cut original gypsum board passes through a force-drying machine so as to obtain a dried gypsum core covered with the base papers for gypsum board. Finally, the gypsum core covered with the base papers for gypsum board is cut into a desired dimension so as to obtain a weight-saved gypsum board product.

In a method of manufacturing a weight-saved gypsum board according to the present invention, the foaming agent is obtained by preliminarily adding a pore size adjusting agent for adjusting the sizes of independent foams distributed in the foamed gypsum slurry (or a gypsum core) into a foaming agent stock solution or a mixture of a foaming agent stock solution and water. The addition of the pore size adjusting agent into a foaming agent stock solution or a mixture of a foaming agent stock solution and water is performed just before producing the foams from the foaming agent.

According to a method of manufacturing weight-saved gypsum board of the present invention, since foams produced from the foaming agent that contains the pore size adjusting agent are mixed into the kneaded material that contains the calcined gypsum and water, even if the kinds and compounding ratios of gypsum raw materials vary, the sizes of the pores in the gypsum core of the weight-saved gypsum board product can be adjusted to a desired range in a short time and at a low cost. That is, a gypsum core having a core structure (pore structure), in which relatively large sized and approximately spherical-shaped pores are uniformly dispersed, can be obtained. According to a method of manufacturing a weight-saved gypsum board of the present invention, a method of manufacturing a weight-saved gypsum board having a gypsum core with high strength and excellent adhesion properties of the gypsum core with the base papers for gypsum board can be provided.

In a method of manufacturing a weight-saved gypsum board according to the present invention, a method for producing a foam having bubbles of the desired size from a foaming agent may be a prefoaming method such that air is blown into a foaming agent and is not particularly limited. For implementing the prefoaming method, a mixing apparatus for mixing the foam having bubbles into the kneaded material has mainly a foaming agent accepting tank for accepting a foaming agent stock solution, a pump for pumping a certain amount of the foaming agent stock solution from the foaming agent accepting tank, a foaming apparatus for blowing pressurized air into the foaming agent stock solution pumped from the foaming agent accepting tank and stirring the mixture of the foaming agent stock solution and the air so as to produce a foam having bubbles from the foaming agent stock solution, and at least one pump for delivering the foams produced from the foaming agent stock solution into a kneaded material that contains a calcined gypsum and water.

The mixing apparatus may have a water tank for storing water and a pump for pumping a certain amount of water from the water tank. In this case, the certain amount of water is preliminarily mixed into the foaming agent stock solution just before the pressurized air is blown into the foaming agent so as to produce the foams from the foaming agent.

Furthermore, the mixing apparatus may have a dilution tank for diluting the foaming agent with water to a predetermined dilution ratio so as to prepare an aqueous solution of the foaming agent stock solution, and a pump for pumping a certain amount of the aqueous solution of the foaming agent stock solution. In this case, pressurized air is not blown into the foaming agent stock solution but the aqueous solution of the foaming agent stock solution is prepared at once and pressurized air is blown into the aqueous solution of the foaming agent stock solution so that foams are produced from the aqueous solution of the foaming agent stock solution.

As the foaming apparatus, shearing force produced by high-speed stirring may be further applied to the foaming agent that is provided on the condition of a stock solution or an aqueous solution and produces foams using pressurized air. Alternatively, the foaming agent may pass through fine particulate beads so as to produce a foam having bubbles fully. In order to obtain a certain amount of foams by improving the quantitative precision for the foaming agent, the water, and the air, a publicly known flowmeter may be provided in the way of a pipeline for delivering each substance so as to control the rate of flow of each substance automatically.

The foaming agent used for the method of manufacturing a weight-saved gypsum board according to the present invention is not particularly limited, and anionic, cationic, nonionic and amphoteric surface active agents may be used, which agents are conventionally used in the manufacture of gypsum boards and publicly known as air entraining agents for cement. The foaming agent is preferably an anionic surface active agent and more particularly sulfates of alkyls, alkyl aryls, alkyl ethers, alkyl aryl ethers, poly(oxyethylene) alkyl ethers (poly(ethyleneoxide) alkyl ethers), and poly(oxyethylene) poly(oxypropylene) alkyl ethers (poly(ethyleneoxide) poly(propyleneoxide) alkyl ethers) etc.

In a method of manufacturing a weight-saved gypsum board according to the present invention, as described above, a foaming agent stock solution can be used as it is, and an aqueous solution of a foaming agent stock solution that is prepared by diluting the foaming agent stock solution with water preliminarily or just before the foaming can also be used. When the foaming agent stock solution is diluted with water, the dilution ratio for the foaming agent stock solution can be set arbitrarily and preferably is within a range of foaming agent stock solution:water=1:1 through 1:1000. If the dilution ratio is larger than the range, the stability of the foams significantly lowers, so that defoaming and foam-breaking occur in time of mixing the foam having bubbles into the kneaded material. As a result, it is difficult to distribute pores uniformly in an obtained gypsum core. On the other hand, if the dilution ratio is smaller than the range, the loading of the foaming agent stock solution is overabundant, so that pressure for delivering the foaming agent may not be enough and controlling the rate of flow of the foaming agent may be difficult. Additionally, in time of mixing the foam having bubbles into the kneaded material, a portion of defoamed or broken foams may foam up again. As a result, even if the pore size adjusting agent is added into the foaming agent, the sizes of the pores in the gypsum core cannot be adjusted.

Next, a pore size adjusting agent is described which is used in a method of manufacturing a weight-saved gypsum board according to the present invention. Such pore size adjusting agent is roughly classified into an agent for increasing the size of foams in foamed gypsum slurry when the size of the foams in the foamed gypsum slurry is smaller than a desired size range, and an agent for decreasing the size of foams in foamed gypsum slurry when the size of the foams in the foamed gypsum slurry is larger than a desired size range.

Herein, the agent for increasing the size of foams in foamed gypsum slurry contains at least one substance selected from the group including water-soluble acidic substances, strong acids, and water-soluble strong alkaline substances. The agent for increasing the size of foams in foamed gypsum slurry preferably contains aluminum sulfate, aluminum potassium sulfate (potassium alum), aluminum ammonium sulfate (ammonium alum), ferric sulfate, polyvalent metal sulfates such as polyferric sulfate, strong acids such as sulfuric acid and sulfamic acid, and strong alkalis such as sodium hydroxide and potassium hydroxide, more preferably the polyvalent metal sulfates.

The agent for decreasing the size of foams in foamed gypsum slurry contains at least one surface active agent selected from the group including sulfosuccinate-type surface active agents, sarcosinate-type surface active agents, alkylbenzene sulfonate-type surface active agents, alkane sulfonate-type surface active agents, and alkylbetaine-type surface active agents.

The pore size adjusting agents are preferably liquid or water-soluble solid. More preferably, the pore size adjusting agent is preliminarily obtained by mixing and diluting the agent with water. When the concentration of the aqueous solution of the pore size adjusting agent is too high, even if a small amount of the aqueous solution is added into the foaming agent, the changes of the sizes of pores formed by bubbles obtained in the foaming apparatus are too large. As a result, the size of pores in a finally obtained gypsum core become too large or too small. Additionally, it becomes very difficult to control the rate of flow of the aqueous solution of the pore size adjusting agent. On the other hand, when the concentration of the aqueous solution of the pore size adjusting agent is too low, the amount of water added into the foaming agent preliminarily or just before the foaming can be adjusted to some extent. However, the amount of water that is directly kneaded with the calcined gypsum is reduced. When the aqueous solution of the pore size adjusting agent is prepared, the concentration of the aqueous solution of the pore size adjusting agent is 10% by weight through 80% by weight, preferably 20% by weight through 70% by weight.

In a method of manufacturing a weight-saved gypsum board according to the present invention, just before producing a foam having bubbles of the desired pore size from the foaming agent, a pore size adjusting agent is poured into a pipeline for delivering the foaming agent stock solution or the aqueous solution of the foaming agent stock solution. For the pour of the pore size adjusting agent, provided are a pore size adjusting agent accepting tank for accepting a pore size adjusting agent, if necessary, a pore size adjusting agent diluting and dissolving tank for diluting the pore size adjusting agent with water, and a pump for pumping the pore size adjusting agent from the pore size adjusting agent diluting and dissolving tank, etc. Such equipment is used to pour the aqueous solution of the pore size adjusting agent into the foaming agent or into the aqueous solution of the foaming agent delivered through the pipeline. Furthermore, a tube-type mixing apparatus such as a static mixer may be provided on a pipeline portion between the foaming apparatus and the position at which the pore size adjusting agent is poured into the foaming agent stock solution or the aqueous solution of the foaming agent stock solution. In order to keep the loading of the pore size adjusting agent constant, the rate of flow of the pore size adjusting agent may be automatically controlled using a publicly known flowmeter similar to the flowmeter for the foaming agent.

In a method of manufacturing a weight-saved gypsum board according to the present invention, just before producing a foam having bubbles with the desired sizes from the foaming agent, the sizes of pores formed by bubbles in the foamed gypsum slurry can be easily controlled by adjusting the loading(s) of the agent for increasing the foam sizes and/or the agent for decreasing the foam sizes to the foaming agent independently or in combination. Each of the pore size adjusting agents can be added into the foaming agent independently, in compliance with desired conditions for foams in the obtained foamed gypsum slurry, particularly, desired sizes of the foams. Additionally, a multiple of the pore size adjusting agents can be used in combination and each of the loadings of the pore size adjusting agents can also be adjusted. The loadings of the pore size adjusting agents are not particularly limited, and can be set generally in the range of 0.00001 parts by weight through 0.005 parts by weight, preferably in the range of 0.0005 parts by weight through 0.003 parts by weight, per 100 parts by weight of calcined gypsum, regardless of the case of adding the pore size adjusting agent independently or the case of using a multiple of the pore size adjusting agents in combination.

As a method of adding the pore size adjusting agents into the foaming agent, if the pore size adjusting agents are liquid, the pore size adjusting agents can be used as they are or diluted with water for use. If the pore size adjusting agents are solid in powder-form, it is desirable to dissolve the pore size adjusting agents in water so as to prepare an aqueous solution of suspension of the pore size adjusting agents at once and to add the aqueous solution or suspension into the foaming agent. Then, an inlet for the pore size adjusting agents is provided on a pipeline portion for delivering the foaming agent adjacent to the foaming apparatus and the pore size adjusting agents are poured into the foaming agent through the inlet. In the flow of the foaming agent, a tube-type mixing apparatus may be provided at the downstream side of the inlet. When both of the agent for increasing the foam sizes and the agent for decreasing the foam sizes as the pore size adjusting agents or a multiple of the pore size adjusting agents are poured into the foaming agent delivered in the pipeline, each agent is poured into the foaming agent through separate inlets or one common inlet.

Thus, the mixture (as the foaming agent) of the pore size adjusting agents and the foaming agent stock solution or the aqueous solution of the foaming agent stock solution is delivered into the foaming apparatus and air is injected into the flow of the foaming agent so as to produce a foam having bubbles from the foaming agent.

The foams and a kneaded material that contains calcined gypsum and water are stirred and mixed via a mixing and stirring machine or at a slurry extracting part of the mixing and stirring machine, so that foamed gypsum slurry in which independent foams with a desired size are uniformly distributed can be obtained.

When a method of manufacturing a weight-saved gypsum board according to the present invention is implemented, just before shaping the foamed gypsum slurry obtained as described above into a board shape in a shaping machine, it is desirable to sample and harden the foamed gypsum slurry regularly so as to obtain a harden foamed gypsum and to confirm the conditions of pores, particularly pore sizes, in a fracture plane of the hardened foamed gypsum. In order to confirm the condition of the pores in the hardened foamed gypsum, a fracture plane of the hardened foamed gypsum may be observed by visual observation or by using a magnifier so as to judge whether or not the pores with the desired sizes are formed. Also, whether or not the pores with the desired sizes are formed may be judged by using a publicly known method in which a fracture plane of the hardened foamed gypsum is subjected to skew rays and lights and darks of an image on an arbitrary straight line or a predetermined section within a visual field using an imaging device such as a CCD camera. If the sizes of pores formed by bubbles in the foamed gypsum slurry are too small or smaller than a desired size range, the loading of the agent for increasing the foam sizes is increased within the range for the loading. If the sizes of pores formed by bubbles in the foamed gypsum slurry are too large or larger than the desired size range, the agent for decreasing the foam sizes is similarly increased. Accordingly, the sizes of pores formed by bubbles in the foamed gypsum slurry can be adjusted timely and in a short time.

According to a method of manufacturing a weight-saved gypsum board of the present invention, even if some kinds of gypsum raw materials are compounded or only natural gypsum is used, the structure of pores in a gypsum core, that is, the size of pores in a gypsum core can be adjusted timely and freely by mixing foams produced from a foaming agent that contains a pore size adjusting agent into gypsum slurry that contains water and calcined gypsum obtained by calcining a gypsum material that contains a gypsum raw material.

When aluminum sulfate is used as the pore size adjusting agent by adding and mixing it into a foaming agent just before producing a foam having bubbles with that desired sizes from the foaming agent, the loading of it can be significantly reduced compared to the loading of it as a foam stabilizer used in the conventional ways of adding and mixing it into gypsum slurry directly, and consequently, the production cost for a weight-saved gypsum board product can also be reduced.

EXAMPLES

Next, the present invention is further illustrated specifically by using examples and comparisons.

(Gypsum Materials)

In regard to reference 1, examples 1 through 3, and comparison 1 described below, a gypsum material was used in which a plurality of gypsum raw materials with the following kinds and compounding ratios were uniformly compounded. Also, in regard to reference 2, example 4, and comparison 2, only the following natural gypsum was used as a gypsum material.

Natural gypsum: 50 parts by weight
Phosphogypsum: 15 parts by weight
Fluorogypsum: 10 parts by weight
Flue gas desulfurized gypsum: 20 parts by weight
Waste recycle gypsum: 5 parts by weight Additionally, the representative vales measured by chemical analysis for the gypsum raw materials were as follows.

Natural gypsum: the purity of dihydrate gypsum 93%, $CaCO_3$ 3.5%, $SiO_2$ 3%, $R_2O_3$ and others 0.5%, pH 6.2 (wherein R represents Al and Fe, etc., which is also applied hereinafter.)

Phosphogypsum: the purity of dihydrate gypsum 98%, total $P_2O_3$ 0.3%, fluorine 0.4%, $SiO_2$ 0.5%, $R_2O_3$ and others 0.4%, pH 4.1

Fluorogypsum: the purity of dihydrate gypsum 91%, $SiO_2$ 1%, $R_2O_3$ and others (mainly anhydrous gypsum) 8%, pH 6.0

Flue gas desulfurized gypsum: the purity of dihydrate gypsum 98%, $SiO_2$ 0.6%, $R_2O_3$ and others 1.4%, pH 6.1

Waste recycle gypsum: the purity of dihydrate gypsum 90%, paper components 6%, $R_2O_3$ and others 4%, pH 6.3

(Foaming agent) Alkyl ether sulfate (produced by Toho Chemical Industry Co., Ltd.)

(Hardening accelerator) 2.8 parts by weight of dihydrate gypsum and 0.2 parts by weight of potassium sulfate (Pore Size Adjusting Agents)

Agent for increasing foam size: aluminum sulfate (extra pure reagent, produced by Daimei Chemical)

Agent for decreasing foam size: sulfosuccinate-type surface active agent (KOHACOOL L-300 produced by Toho Chemical Industry Co., Ltd.)

[Reference 1]

100 parts by weight of calcined gypsum obtained by calcining a gypsum material that contains the gypsum raw materials described above, 85 parts by weight of water, and 3.0 parts by weight of hardening accelerator were kneaded using a commonly used pin mixer so as to obtain gypsum slurry. Air was injected into an aqueous solution of the foaming agent stock solution that is described above using a spiral pump as a foaming apparatus so as to obtain foams. A foam addition port was provided on a slurry discharging part of the pin mixer and the foams were added and mixed into gypsum slurry that outflows from the slurry discharging part so as to obtain foamed gypsum slurry. On the other hand, a portion of the obtained gypsum slurry described above was fractionated and applied on a surface of a front-side base paper for gypsum board previously using a roll coater and the foamed gypsum slurry was poured into a space between the front-side and a back-side base papers for gypsum board so as to manufacture a board-shaped and weight-saved gypsum board with a thickness of 12.5 mm (a width of 910 mm, a length of 1820 mm, and a density of 0.65 g/cm$^3$). The amount of slurry retained in a gypsum board shaping machine was controlled so that it is kept substantially constant volume.

Then, one of the manufactured weight-saved gypsum boards was randomly sampled and test pieces for adhesion test, bending test, and core strength test were sampled from the weight-saved gypsum board. A test piece for SEM (scanning electron microscope) observation was sampled from the center portion of the remaining fragment of the weight-saved gypsum board along the width direction. In those tests, the adhesion test and the SEM observation were performed just before sampling each test piece and the remaining tests were performed after drying in a dryer at the temperature of 40° C. for 24 hours. The methods of the respective tests are described below.

(Adhesion Test)

A test piece with a total width of 910 mm and a length of 300 mm was sampled from one surface of the randomly sampled weight-saved gypsum board. Then, a break along the width direction across the total width of the test piece was made on a back surface paper of the test piece using a cutter. Then, the test piece was bent in a direction opposite to the surface having the break and the test piece was stretched along the direction so that force was applied uniformly along the width direction so as to be separated from a front surface paper fully. Afterward, the surface area of an adhering part of the base paper for gypsum board (the front surface paper) with a gypsum core of the test piece was measured, the rate of which (surface area ratio) (represented by %) was calculated. Likewise, an adhering test in regard to the back surface of the same test piece was performed and the surface area ratio (represented by %) of an adhering part was also calculated. These ratios of the surface area of an adhering part between the base paper for gypsum board and the gypsum core to the surface area of the test piece on the one side, which are represented in percent, were regarded as the results of the adhesion test.

(Bending Test)

The bending test for the test piece of the sampled weight-saved gypsum board was performed based on the JIS A6901 standard.

(Core Strength Test)

The core strength test for the test piece of the sampled weight-saved gypsum board was performed based on ASTM C473-00"nail drawing resistance test".

(SEM Observation)

A fracture plane of the gypsum core of the test piece was observed using a magnifier after the bending test. Furthermore, gold was vapor-deposited on a part with a representative pore structure according to a common method and the part was observed using an SEM.

The test results are shown in FIG. 1 and Table 1.

TABLE 1

|  | Adhesion Properties (Front surface/ Back surface) | Breaking load (N) | | Nail drawing resistance (N) |
| --- | --- | --- | --- | --- |
|  |  | Horizontal direction | Vertical direction |  |
| Reference 1 | 100/100 | 580 | 230 | 411 |
| Example 1 | 100/100 | 590 | 240 | 428 |
| Example 2 | 100/100 | 590 | 230 | 425 |
| Example 3 | 95/95 | 550 | 220 | 400 |
| Comparison 1 | 100/100 | 570 | 230 | 416 |
| Reference 2 | 90/90 | 530 | 200 | 362 |
| Example 4 | 100/100 | 550 | 220 | 370 |
| Comparison 2 | 20/20 | 510 | 190 | 359 |

Example 1

A weight-saved gypsum board with a thickness of 12.5 mm (a width of 910 mm, a length of 1820 mm, and a density of 0.65 g/cm.sup.3) was manufactured similar to reference 1 except adding 0.0005 parts by weight of aluminum sulfate as a pore size adjusting agent for increasing the size of pores formed by bubbles in the foamed gypsum slurry per 100 parts by weight of the calcined gypsum into the aqueous solution of the foaming agent stock solution, and blowing air into the aqueous solution of the foaming agent stock solution that contains aluminum sulfate so as to produce a foam having bubbles with the desired pore size. Also, one of the manufactured weight-saved gypsum boards was randomly sampled and tests similar to those of reference 1 were performed. The results are shown in FIG. 2 and Table 1.

Figure 2:
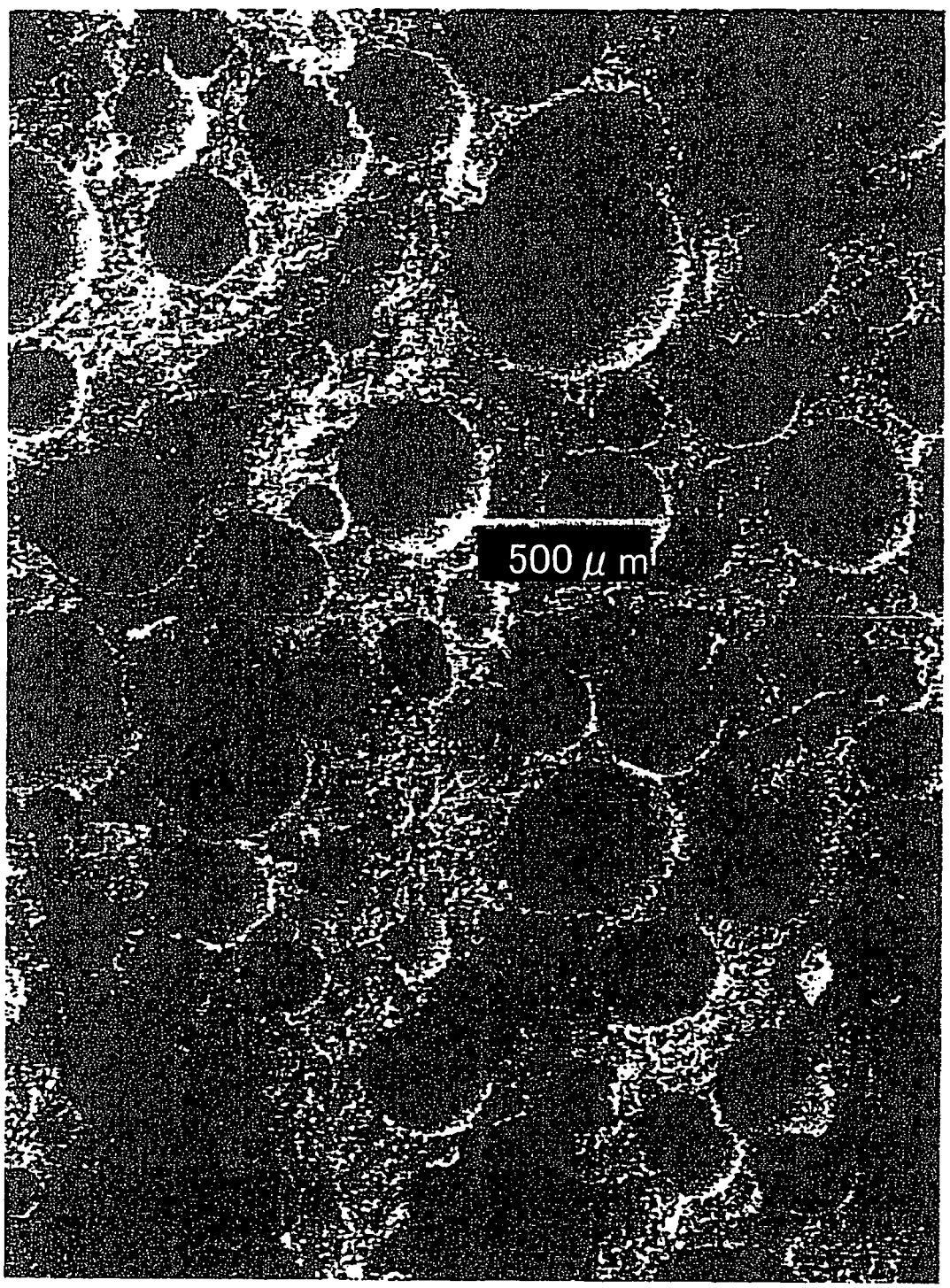
FIG. 2 is a view showing pores in the weight-saved gypsum board according to example 1.

From the result of an SEM observation shown in FIG. 2, it will be understood that the weight-saved gypsum board of Example 1 has pores larger than the pores in the weight-saved gypsum board of Reference 1.

Example 2

A weight-saved gypsum board with a thickness of 12.5 mm (a width of 910 mm, a length of 1820 mm, and a density of 0.65 g/cm.sup.3) was manufactured similar to reference 1 except adding 0.005 parts by weight of aluminum sulfate as a pore size adjusting agent for increasing the size of foams in the foamed gypsum slurry per 100 parts by weight of the calcined gypsum into the aqueous solution of the foaming agent stock solution, and blowing air into the aqueous solution of the foaming agent stock solution that contains aluminum sulfate so as to produce a foam having bubbles. Also, one of the manufactured weight-saved gypsum boards was randomly sampled and tests similar to those of reference 1 were performed. The results are shown in FIG. 3 and Table 1.

Figure 3:
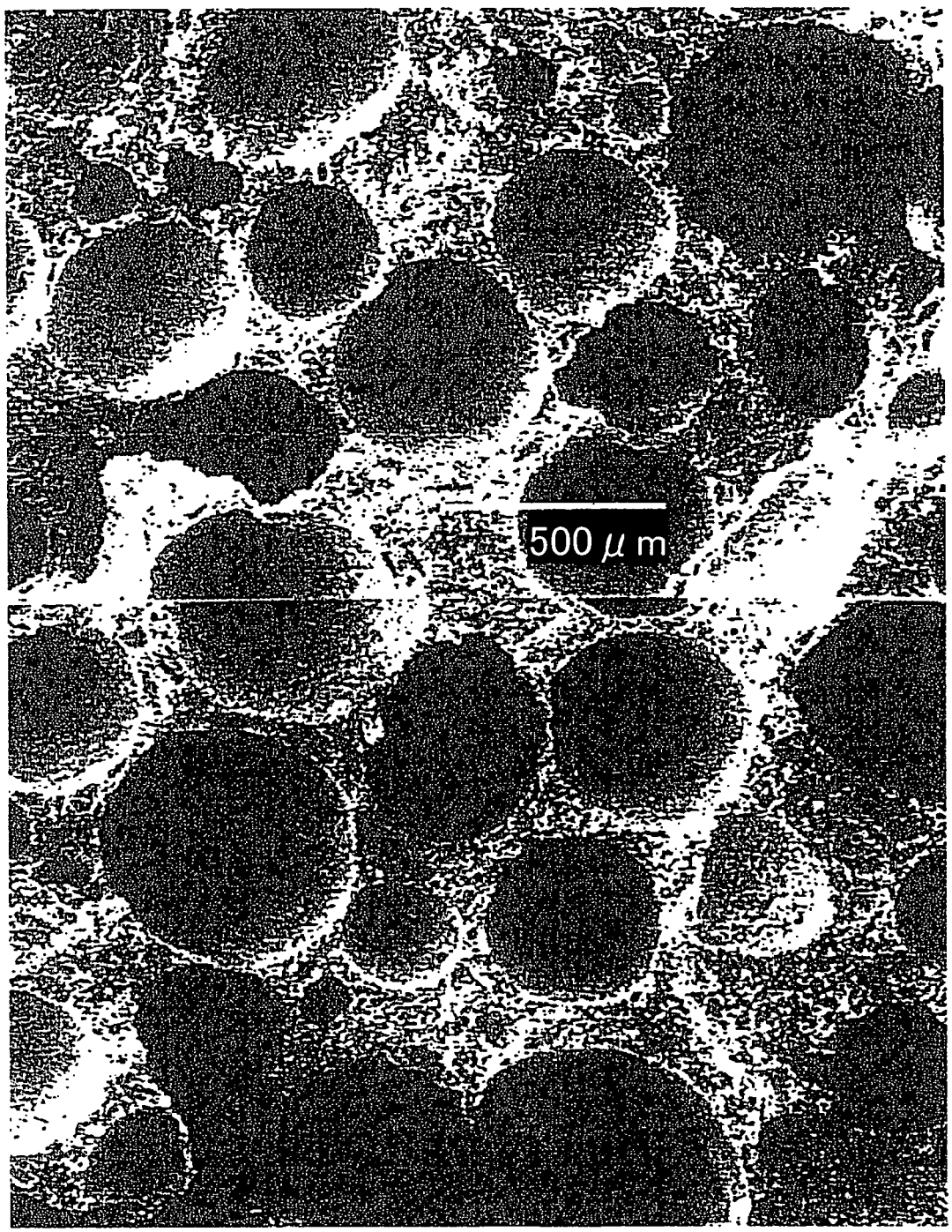
FIG. 3 is a view showing pores in the weight-saved gypsum board according to example 2.

From the result of an SEM observation shown in FIG. 3, it will be understood that the weight-saved gypsum board of Example 2 has pores larger and more stable than the pores in the weight-saved gypsum board of Example 1.

Example 3

A weight-saved gypsum board with a thickness of 12.5 mm (a width of 910 mm, a length of 1820 mm, and a density of 0.65 g/cm.sup.3) was manufactured similar to reference 1 except adding 0.003 parts by weight of the sulfosuccinate-type surface active agent as a pore size adjusting agent for decreasing the size of pores formed by bubbles in the foamed gypsum slurry per 100 parts by weight of the calcined gypsum into the aqueous solution of the foaming agent stock solution, and blowing air into the aqueous solution of the foaming agent stock solution that contains the sulfosuccinate-type surface active agent so as to produce a foam having bubbles. Also, one of the manufactured weight-saved gypsum boards was randomly sampled and tests similar to those of reference 1 were performed. The results are shown in FIG. 4 and Table 1.

Figure 4:
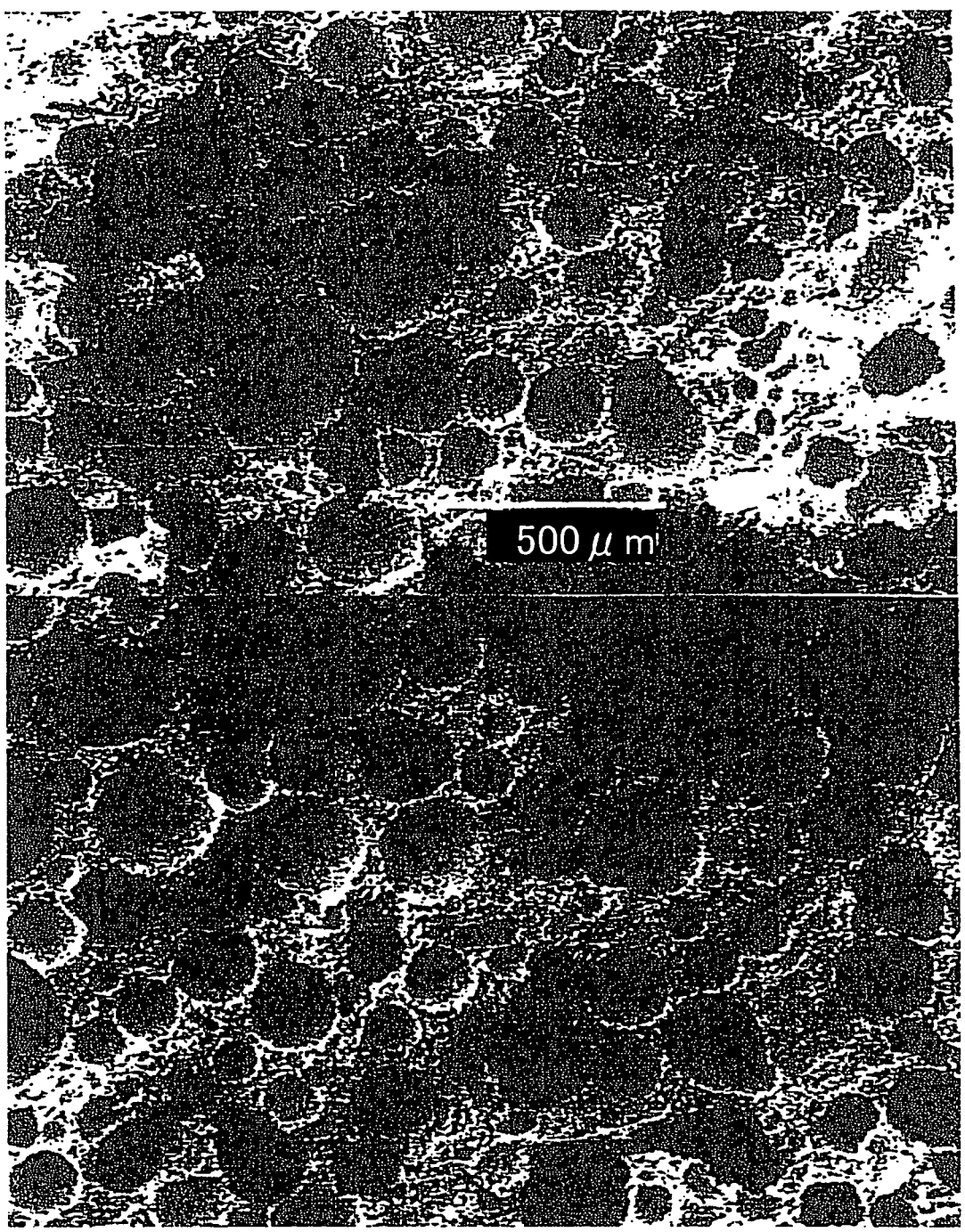
FIG. 4 is a view showing pores in the weight-saved gypsum board according to example 3.

From the result of an SEM observation shown in FIG. 4, it will be understood that the weight-saved gypsum board of Example 3 has pores smaller and more stable than the pores in the weight-saved gypsum board of Reference 1.

[Comparison 1]

In the weight-saved gypsum board disclosed in Japanese Laid-Open Patent Application No. 10-330174, 85 parts by weight of water, 3.0 parts by weight of hardening accelerator and 0.3 parts by weight of aluminum sulfate as the foam stabilizer per 100 parts by weight of calcined gypsum were kneaded using a commonly used pin mixer so as to obtain gypsum slurry. A portion of the obtained gypsum slurry was applied on a surface of a front-side base paper for gypsum board using a method similar to Example 1. A foam addition port was provided on a slurry extracting part of the pin mixer and the foams produced from the aqueous solution of the foaming agent stock solution were added and mixed into the gypsum slurry so as to obtain foamed gypsum slurry. The foamed gypsum slurry was poured into a space between the front-side and a back-side base papers for gypsum board so as to manufacture a board-shaped and weight-saved gypsum board with a thickness of 12.5 mm (a width of 910 mm, a length of 1820 mm, and a density of 0.65 g/cm$^3$).

Figure 5:
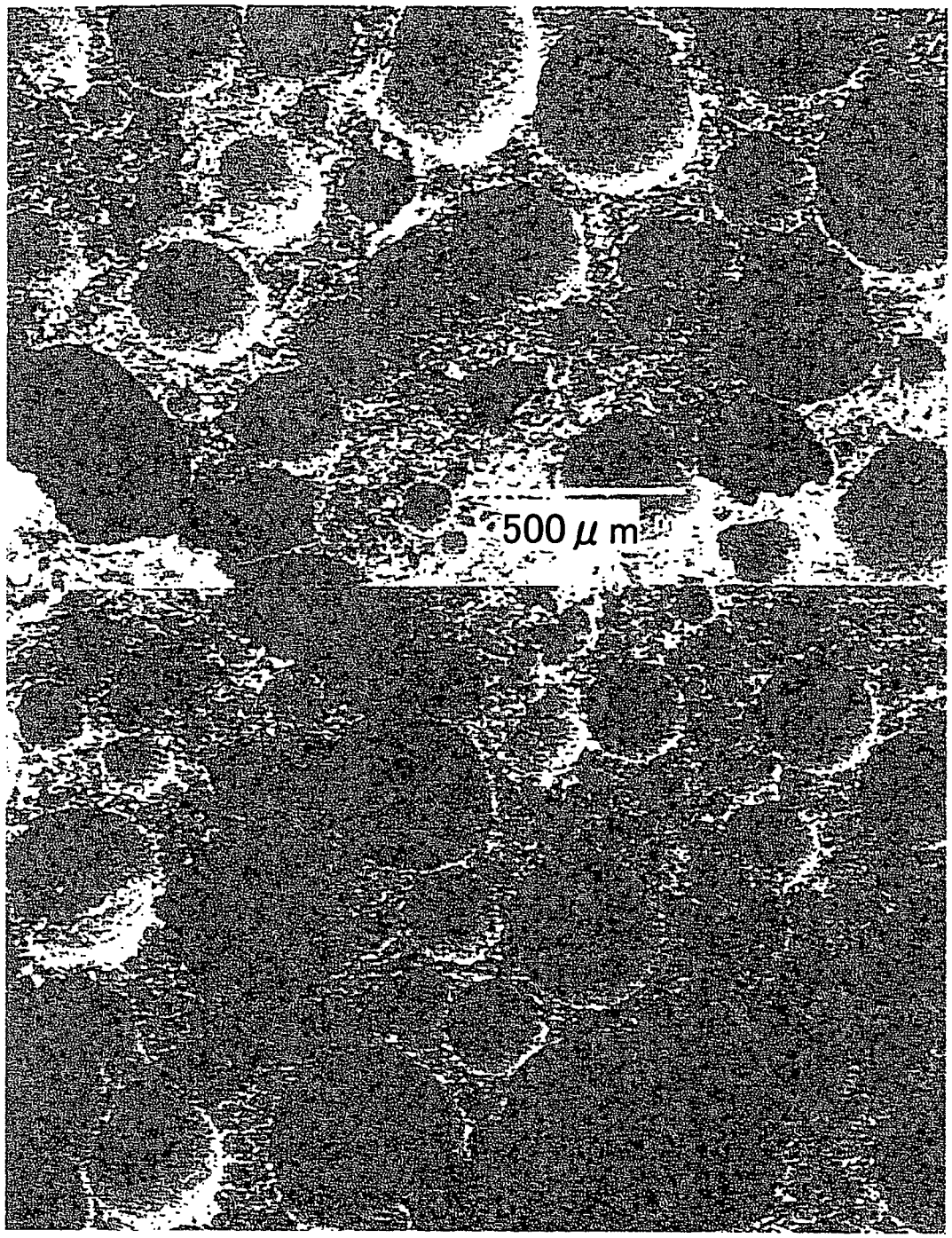
FIG. 5 is a view showing pores in the weight-saved gypsum board according to comparison 1.

Also, one of the manufactured weight-saved gypsum boards was randomly sampled and tests similar to those of reference 1 were performed. The results are shown in FIG. 5 and Table 1.

The weight-saved gypsum board in Comparison 1 is comparable with the weight-saved gypsum board in Example 1 in regard to the adhesion properties, the flexural strength, and the pore sizes, etc. However, the loading of aluminum sulfate used as the pore size adjusting agent in Example 1 was 0.0005 parts by weight and the loading of aluminum sulfate used as the pore size adjusting agent in Example 2 was 0.005 parts by weight whereas the loading of aluminum sulfate used as the foam stabilizer in Comparison 1 was 0.3 parts by weight. That is, it will be understood that the loadings of the pore size adjusting agents used in Example 1 and Example 2 are very little compared to the loading of the foam stabilizer used in Comparison 1. In accordance with the method of manufacturing a weight-saved gypsum board of the present invention, the loading of the pore size adjusting agent can be significantly reduced compared to the loading of the foam stabilizer in the conventional technique, so that the production cost for a weight-saved gypsum board can also be reduced. Additionally, when other pore size adjusting agents are used, similar results may be obtained.

In the above-mentioned examples, a method of manufacturing a weight-saved gypsum board according to the present invention was applied to a weight-saved gypsum board made from a gypsum material obtained by compounding several kinds of gypsum raw materials. A method of manufacturing a weight-saved gypsum board according to the present invention can also be applied to a weight-saved gypsum board made from a gypsum material that contains only one kind of gypsum raw material as described below.

[Reference 2]

Figure 6:
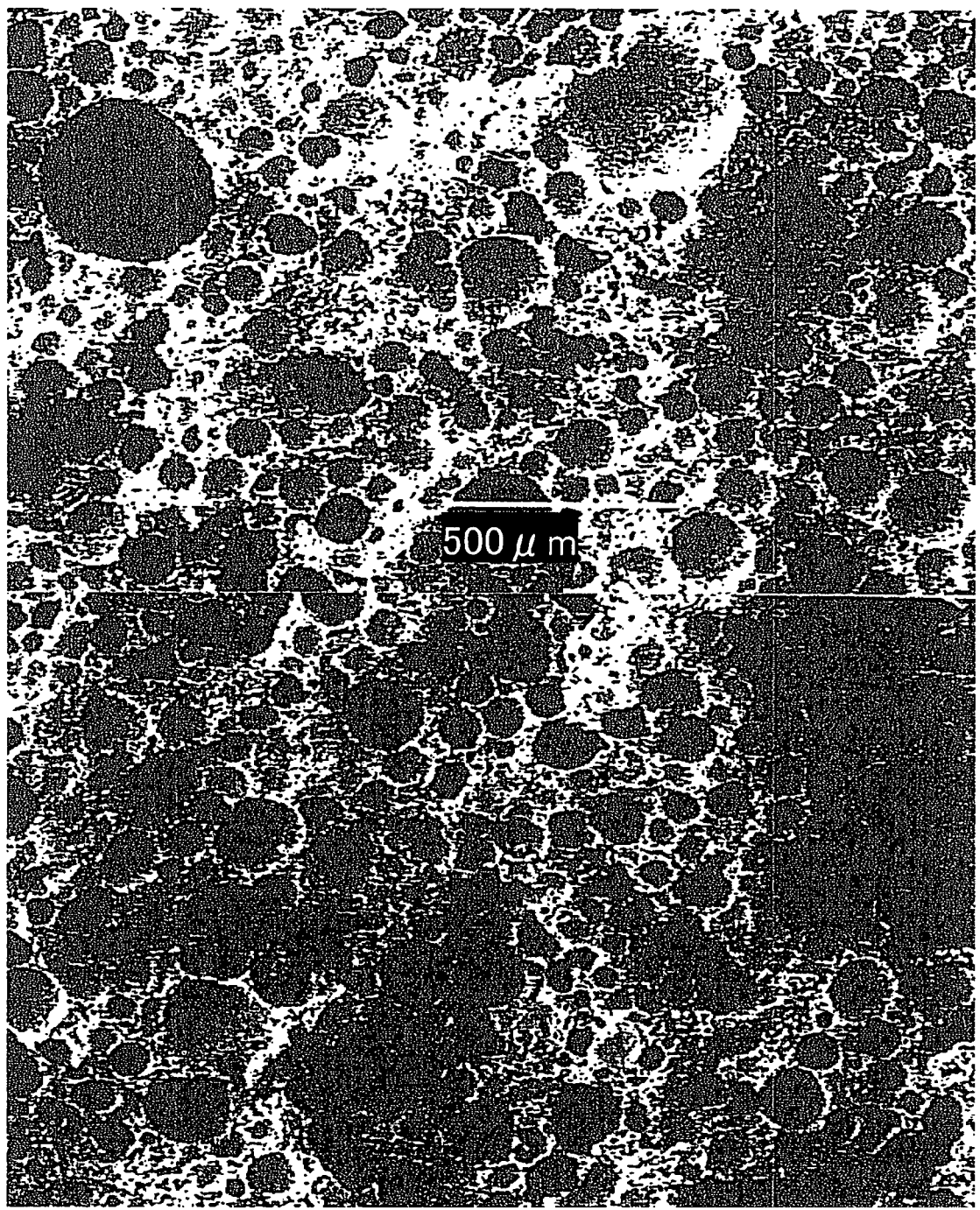
FIG. 6 is a view showing pores in the weight-saved gypsum board according to reference 2.

Foams were obtained by injecting air into an aqueous solution of a foaming agent stock solution using a spiral pump as a foaming apparatus. Then, the foams were mixed into 100 parts by weight of calcined gypsum obtained by calcining only the natural gypsum described above, 85 parts by weight of water, and 3.0 parts by weight of hardening accelerator using a commonly used pin mixer so as to prepare foamed gypsum slurry. Then, a board-shaped and weight-saved gypsum board with a thickness of 12.5 mm (a width of 910 mm, a length of 1820 mm, and a density of 0.65 g/cm$^3$) was manufactured from the foamed gypsum slurry according to a common method. Also, one of the manufactured weight-saved gypsum boards was randomly sampled and tests similar to those of reference 1 were performed. The results are shown in FIG. 6 and Table 1.

Example 4

Figure 7:
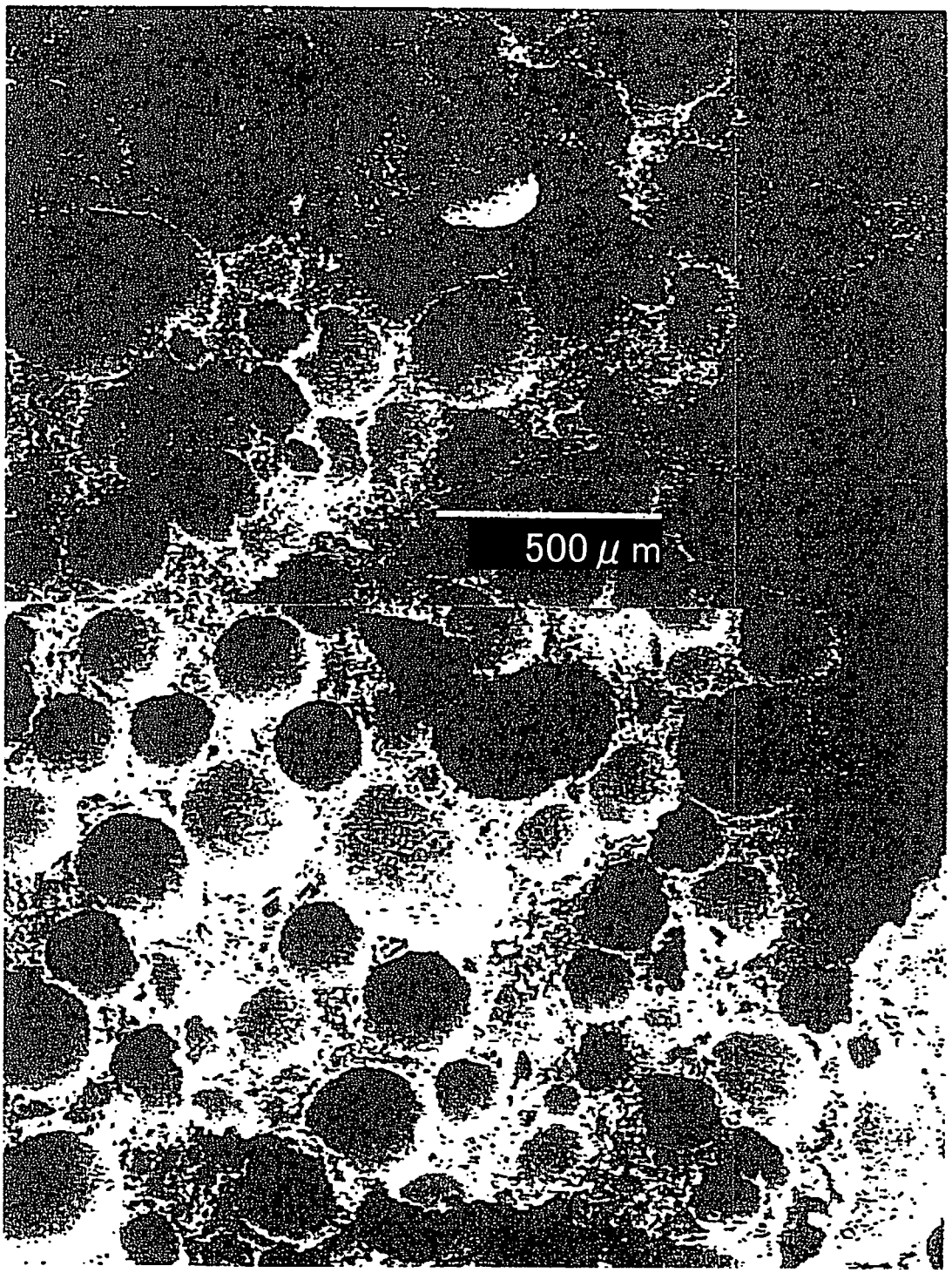
FIG. 7 is a view showing pores in the weight-saved gypsum board according to example 4.

A weight-saved gypsum board with a thickness of 12.5 mm (a width of 910 mm, a length of 1820 mm, and a density of 0.65 g/cm.sup.3) was manufactured similar to reference 2 except adding 0.0005 parts by weight of aluminum sulfate as a pore size adjusting agent for increasing the size of pores formed by bubbles in the foamed gypsum slurry per 100 parts by weight of the calcined gypsum into the aqueous solution of the foaming agent stock solution, and blowing air into the aqueous solution of the foaming agent stock solution that contains aluminum sulfate so as to produce a foam having bubbles. Also, one of the manufactured weight-saved gypsum boards was randomly sampled and tests similar to those of reference 1 were performed. The results are shown in FIG. 7 and Table 1.

[Comparison 2]

Figure 8:
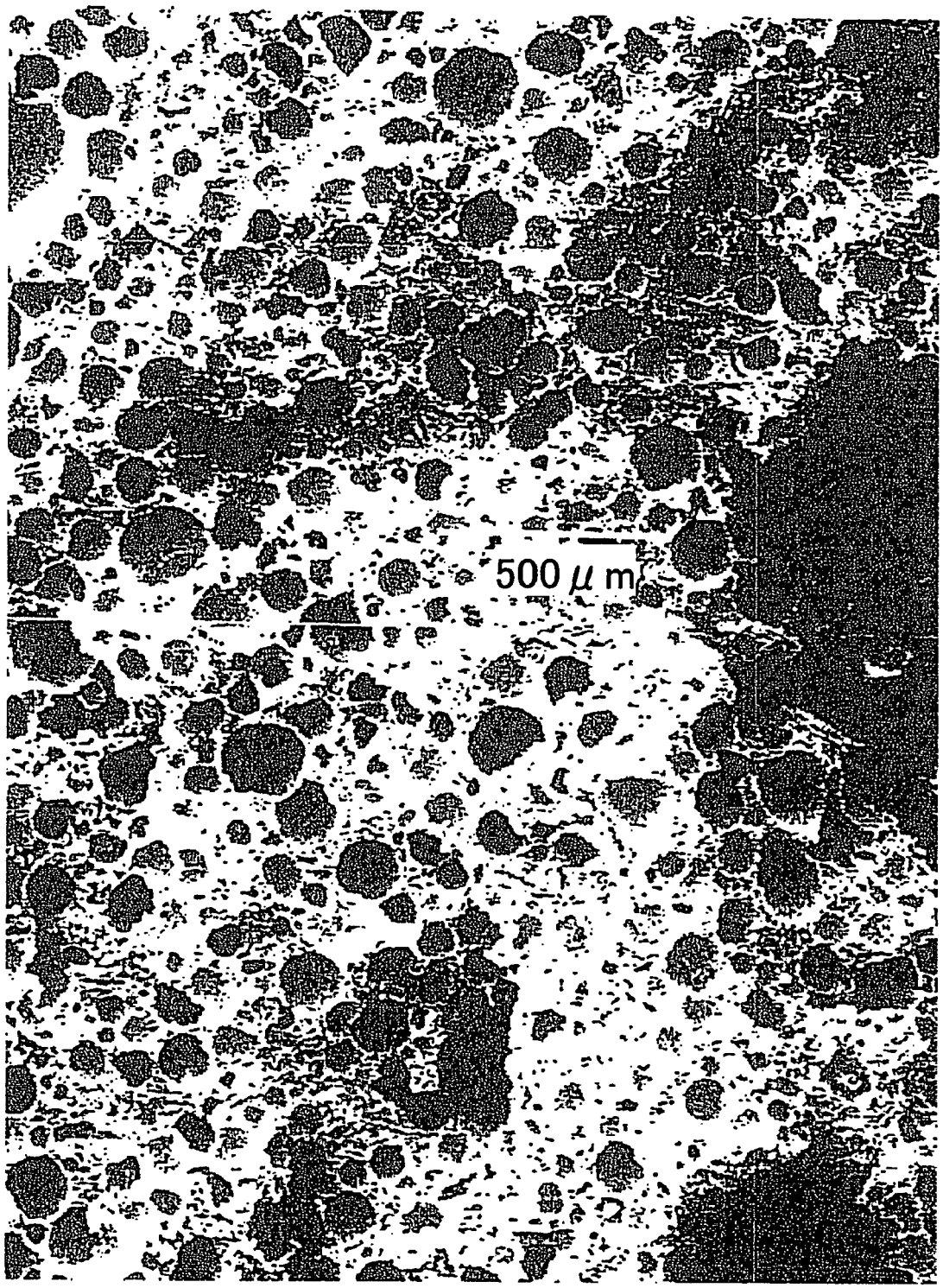
FIG. 8 is a view showing pores in the weight-saved gypsum board according to comparison 2.

According to the conventional technique claimed in claim 12 in Japanese Patent No. 3028123, alkyl sulfate having the chemical formula represented in the claim was diluted with water so as to prepare an aqueous solution. Then, air was blown into the prepared aqueous solution so as to produce a foam having bubbles with a form density of 0.205 g/cm.sup.3 The produced foams were added and mixed into gypsum slurry fractionated from the slurry extracting part using a method similar to Example 1 so as to obtain foamed gypsum slurry. The foamed gypsum slurry was poured into a space between a front-side and a back-side base papers for gypsum board so as to manufacture a board-shaped and weight-saved gypsum board with a thickness of 12.5 mm (a width of 910 mm, a length of 1820 mm, and a density of 0.65 g/cm.sup.3). Also, one of the manufactured weight-saved gypsum boards was randomly sampled and tests similar to those of reference 1 were performed. The results are shown in FIG. 8 and Table 1.

The weight-saved gypsum board of Example 4 obtained by applying a method of manufacturing a weight-saved gypsum board according to the present invention to a weight-saved gypsum board made from a gypsum material that contains a single gypsum raw material has pores with larger sizes and significantly improved adhesion properties compared to the weight-saved gypsum boards in Reference 2 and comparison 2.

From the above-mentioned results, when the gypsum material contains only one kind of a natural gypsum as well as when the gypsum material is obtained by compounding several kinds of gypsum raw materials, the structure of pores in a gypsum core, that is, the sizes of the pores in the gypsum core can be adjusted timely and freely by mixing foams produced from a foaming agent that contains a pore size adjusting agent into gypsum slurry that contains water and calcined gypsum obtained by calcining the gypsum material that contains the gypsum raw material(s).

Additionally, the present invention is not limited to the examples described above and the examples described above can be improved and modified within the scope of the present invention.

The invention claimed is:

1. A method of manufacturing weight-saved gypsum board in which pores with a predetermined size are distributed in a gypsum core, comprising the steps of:
   blowing air into a foaming agent to produce a foam having bubbles;
   mixing the foam having bubbles into a kneaded material that contains calcined gypsum and water to obtain foamed gypsum slurry;
   pouring the foamed gypsum slurry into a space between upper and lower papers for gypsum board;
   shaping the base papers and the foamed gypsum slurry into a board shape;
   roughly cutting off and subsequently drying the board shape; and
   cutting off the dried board shape into a product dimension;
   wherein the method further comprises the step of preliminarily adding a pore size adjusting agent for adjusting sizes of pores formed by bubbles distributed in the foamed gypsum slurry to one of a stock solution of the foaming agent and a mixture of a stock solution of the foaming agent and water to obtain the foaming agent for producing a foam having bubbles with desired sizes;
   wherein the pore size adjusting agent contains at least one substance selected from the group consisting of agents for decreasing sizes of pores formed by bubbles in the foamed gypsum slurry; and
   the agent for decreasing sizes of pores formed by bubbles in the foamed gypsum slurry contains at least one substance selected from the group consisting of sulfosuccinate-type surface active agents, sarcosinate-type surface active agents, alkylbenzene sulfonate-type surface active agents, alkane sulfonate-type surface active agents, and alkylbetaine-type surface active agents.

2. The method of manufacturing a weight-saved gypsum board as claimed in claim 1, wherein in a content of the pore size adjusting agent in the foaming agent is 0.00001 parts by weight through 0.005 parts by weight per 100 parts by weight of the calcined gypsum.

3. A method of manufacturing a weight-saved gypsum board in which pores with a predetermined size are distributed in a gypsum core, comprising the steps of:
   blowing air into a foaming agent to produce a foam having bubbles;
   mixing the foam having bubbles into a kneaded material that contains calcined gypsum and water to obtain foamed gypsum slurry;
   pouring the foamed gypsum slurry into a space between upper and lower base papers for gypsum board;

shaping the base papers and the foamed gypsum slurry into a board shape;

roughly cutting off and subsequently drying the board shape; and cutting off the dried board shape into a product dimension;

wherein the method further comprises the step of preliminarily adding a pore size adjusting agent for adjusting sizes of pores formed by bubbles distributed in the foamed gypsum slurry to one of a stock solution of the foaming agent and a mixture of a stock solution of the foaming agent and water to obtain the foaming agent for producing a foam having bubbles with desired sizes;

wherein the pore size adjusting agent contains at least one substance selected from the group consisting of agents for increasing sizes of pores formed by bubbles in the foamed gypsum slurry; and the agent for increasing sizes of pores formed by bubbles in the foamed gypsum slurry contains at least one substance selected from the group consisting of sulfuric acid, sulfamic acid, sodium hydroxide, and potassium hydroxide.

4. The method of manufacturing a weight-saved gypsum board as claimed in claim 3, wherein a content of the pore size adjusting agent in the foaming agent is 0.00001 parts by weight through 0.005 parts by weight per 100 parts by weight of the calcined gypsum.

5. The method of manufacturing a weight—saved gypsum board as claimed in claim 3, wherein the agent for increasing sizes of pores formed by bubbles in the foamed gypsum slurry contains at least one substance selected from the group consisting of sulfuric acid, sulfamic acid, and potassium hydroxide.

* * * * *